United States Patent
Tsujita

(10) Patent No.: US 11,092,516 B2
(45) Date of Patent: Aug. 17, 2021

(54) TIRE CONDITION MONITORING SYSTEM, TRANSMITTER, AND RECEIVER

(71) Applicant: PACIFIC INDUSTRIAL CO., LTD., Gifu-ken (JP)

(72) Inventor: Yasuhisa Tsujita, Motosu (JP)

(73) Assignee: PACIFIC INDUSTRIAL CO., LTD., Gifu-Ken (JP)

( * ) Notice: Subject to any disclaimer, the term of this patent is extended or adjusted under 35 U.S.C. 154(b) by 0 days.

(21) Appl. No.: 16/605,851

(22) PCT Filed: Oct. 1, 2018

(86) PCT No.: PCT/JP2018/036756
§ 371 (c)(1),
(2) Date: Oct. 17, 2019

(87) PCT Pub. No.: WO2020/070782
PCT Pub. Date: Apr. 9, 2020

(65) Prior Publication Data
US 2020/0300732 A1    Sep. 24, 2020

(51) Int. Cl.
*G01M 17/02* (2006.01)
*B60C 23/04* (2006.01)
*B60C 23/20* (2006.01)

(52) U.S. Cl.
CPC ......... *G01M 17/02* (2013.01); *B60C 23/0422* (2013.01); *B60C 23/20* (2013.01)

(58) Field of Classification Search
CPC . B60C 23/0433; B60C 23/0416; B60C 11/24; B60C 19/00; B60C 23/0408;
(Continued)

(56) References Cited

U.S. PATENT DOCUMENTS

2003/0201879 A1* 10/2003 Munch ................ B60C 23/0408
340/442
2004/0090322 A1* 5/2004 Tsujita ................ B60C 23/0416
340/442
(Continued)

FOREIGN PATENT DOCUMENTS

FR    2889610 A    2/2007
JP    2012111481 A    6/2012
JP    2014019214 A    2/2014

*Primary Examiner* — Daniel Previl
(74) *Attorney, Agent, or Firm* — Cantor Colburn LLP

(57) ABSTRACT

A tire condition monitoring system includes transmitters that are respectively attached to wheel assemblies of a vehicle. Each transmitter includes a power source, a data generating section, a storage section that stores a correspondence relationship in which ranges obtained by dividing possible values of the detection value of a traveling state detecting section are respectively assigned to a plurality of specific angles set for the rotation angles of the wheel assemblies, and a transmission control section capable of performing specific angle transmission in which the transmission control section transmits the transmission data from the transmitting section when detecting that the rotation angle of the wheel assembly is any of the specific angles. When performing the specific angle transmission, the transmission control section transmits the transmission data when detecting that the rotation angle is the specific angle that corresponds to the detection value of the traveling state detecting section.

3 Claims, 5 Drawing Sheets

(58) Field of Classification Search
CPC .......... B60C 23/0449; B60C 23/0459; B60C 23/0488; B60C 23/0489; B60C 11/246; B60C 23/005; B60C 23/04; B60C 23/0425; B60C 23/20; B60C 23/041; B60C 23/0411; B60C 23/0455; B60C 23/12; B60C 23/0415; B60C 23/0422; B60C 23/0462; G07C 5/008; G07C 5/0808; G07C 5/085; B60N 2002/0272; B60N 2/0232; B60N 2/0276; B60N 2/2863; B60N 2/002; B60R 2021/0004; B60R 2021/23107; B60R 2021/23153; B60R 2021/23161; B60R 2021/23169; B60R 2021/23519; B60R 2021/23523; B60R 2021/23557; B60R 2021/2358; B60R 2021/2359; B60R 21/20; B60R 21/213; B60R 21/232; B60R 21/233; B60R 21/235; B60R 21/30; B60R 2021/01088; B60R 2021/01184; B60R 21/013; B60R 21/0136; G02B 2027/014; G02B 2027/0187; G02B 27/01; G06K 7/10178; G06K 19/0717; G06K 9/00832; G06K 9/00838; G06K 9/2018; G06K 9/6269; G06K 9/66; G01L 17/00; G08C 17/00; G08C 17/02; G08G 1/017; G08G 1/164; B60J 10/00; G05F 1/46; H01Q 1/2241; H03F 3/183; H03G 11/002; B62D 15/0245; B62D 5/0475; B62D 5/0481; G01M 17/02

USPC ...... 340/447, 445, 442, 10.1, 438, 439, 446, 340/440, 825.75, 825.76
See application file for complete search history.

(56) References Cited

U.S. PATENT DOCUMENTS

| | | | |
|---|---|---|---|
| 2004/0257213 A1* | 12/2004 | Tsujita | B60C 23/0433 340/445 |
| 2006/0055524 A1* | 3/2006 | Okubo | B60C 23/0464 340/445 |
| 2008/0051963 A1* | 2/2008 | Kagawa | B60C 23/0416 701/70 |
| 2012/0112899 A1 | 5/2012 | Hannon | |
| 2013/0116972 A1* | 5/2013 | Hanatsuka | G01B 17/08 702/167 |
| 2014/0172241 A1* | 6/2014 | Shima | B60C 23/0488 701/49 |
| 2017/0155977 A1* | 6/2017 | Tsujita | H04Q 9/00 |
| 2017/0164072 A1* | 6/2017 | Tsujita | B60C 23/04 |

* cited by examiner

Fig.4
First Angle
Second Angle
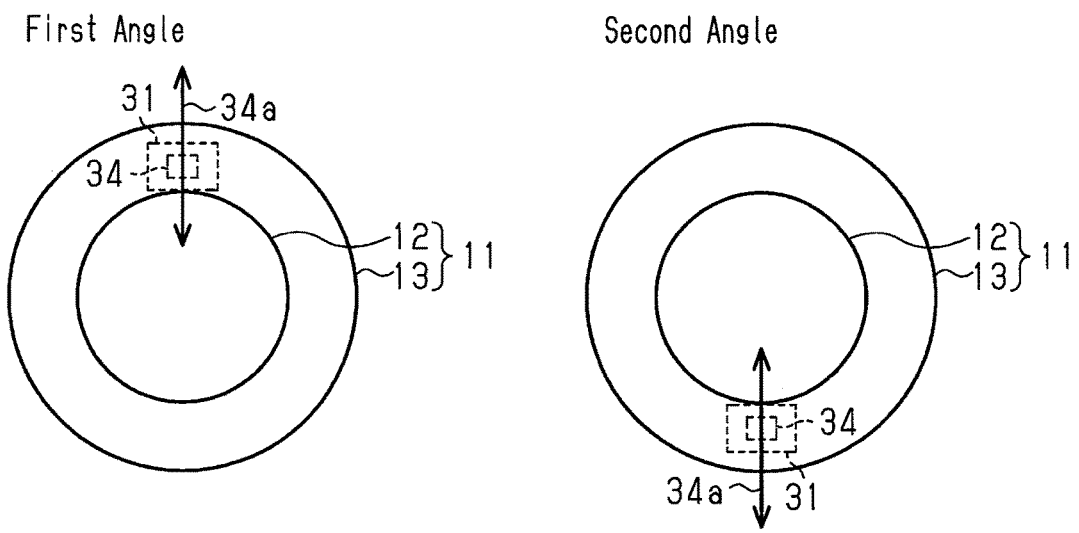
Fig.5
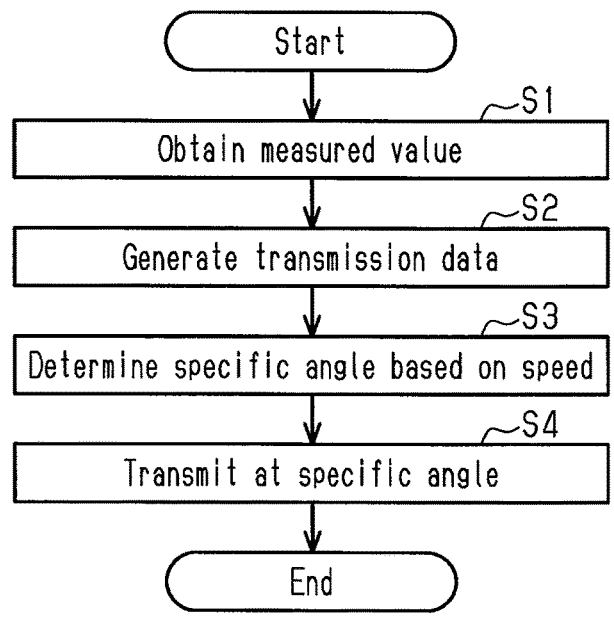
Fig.6
| Preamble | Identifying Code | ID code | Fixed Bit | Pressure Data | Temperature Data | Status Code | Error Detection Code | Stop Bit |
|---|---|---|---|---|---|---|---|---|

| Speed | Range | Specific Angle |
|---|---|---|
| ~40km/h | First Range | First Angle |
| 40km/h~ | Second Range | Second Angle |

TIRE CONDITION MONITORING SYSTEM, TRANSMITTER, AND RECEIVER

TECHNICAL FIELD

The present invention relates to a tire condition monitoring system, a transmitter, and a receiver.

BACKGROUND ART

A tire condition monitoring system is known as a system that allows the driver to check the condition of the tires of a vehicle from the passenger compartment. A tire condition monitoring system includes transmitters, which are respectively attached to wheel assemblies, and a receiver mounted on the vehicle. Each transmitter transmits transmission data including condition data indicating the condition of the tire to the receiver. The receiver receives the transmission data to acquire the condition of the tire.

The receiver performs position identification to identify the wheel assembly to which the transmitter that has transmitted the received transmission data is attached. When the position identification is performed, the transmitter transmits transmission data when the rotation angle of the wheel assembly is a predetermined specific angle. Upon reception of the transmission data, the receiver acquires the rotation angle of each wheel assembly from a rotation angle detecting device, which detects rotation angles of the respective wheel assemblies. The receiver obtains the rotation angle of each wheel assembly each time it receives transmission data. The receiver then identifies the wheel assembly to which each of the transmitters is attached based on variation of the rotation angles of the wheel assemblies.

Some vehicles have a null point, at which signals of transmission data transmitted from the transmitters interfere with each other. When the specific angle, at which the transmission data is transmitted, coincides with the null point, the receiver cannot receive the transmission data transmitted at the specific angle. Thus, each transmitter in Patent Document 1 transmits transmission data at multiple specific angles when the position identification is performed.

PRIOR ART DOCUMENT

Patent Document

Patent Document 1: US Patent Application Publication No. 2012/0112899

SUMMARY OF THE INVENTION

Problems that the Invention is to Solve

When transmission data is transmitted at multiple specific angles, the receiver needs to acquire one of the specific angles at which the received transmission data has been transmitted. However, if the transmission data is transmitted with data indicating angle information, the data length of the transmission data is long, which increases the power consumption.

It is an objective of the present invention to provide a tire condition monitoring system, a transmitter, and a receiver that are capable of reducing power consumption by transmission of transmission data.

Means for Solving the Problems

To achieve the foregoing objective and in accordance with a first aspect of the present invention, a tire condition monitoring system is provided that includes transmitters respectively attached to a plurality of wheel assemblies of a vehicle and a receiver mounted on the vehicle. The vehicle includes rotation angle detecting sections that detect rotation angles of the respective wheel assemblies. Each of the transmitters includes a power source of the transmitter, a condition detecting section that is configured to detect a condition of a tire, a traveling state detecting section, a data generating section, a transmitting section, a storage section, and a transmission control section. The traveling state detecting section is configured such that a detection value varies in accordance with a traveling state of the vehicle. The data generating section is configured to generate transmission data that includes tire condition data indicating the condition of the tire detected by the condition detecting section and does not include data indicating the detection value of the traveling state detecting section. The transmitting section is configured to modulate the transmission data, which is generated by the data generating section, and transmit the modulated data. The storage section stores a correspondence relationship in which ranges obtained by dividing possible values of the detection value of the traveling state detecting section are respectively assigned to a plurality of specific angles set for rotation angles of the wheel assemblies. The transmission control section is capable of performing specific angle transmission in which the transmission control section transmits the transmission data from the transmitting section when detecting that the rotation angle of the wheel assembly is any of the specific angles. The transmission control section is configured to, when performing the specific angle transmission, transmit the transmission data when detecting that the rotation angle of the wheel assembly is the specific angle that corresponds to the detection value of the traveling state detecting section. The receiver includes a receiving section, an identifying section, a reception storage section, and an obtaining section. The receiving section is configured to be capable of receiving the transmission data from the transmitters. Upon reception of the transmission data transmitted at the specific angle, the identifying section identifies one of the wheel assemblies to which the transmitter is attached based on an angle detection value obtained from the rotation angle detecting section. The reception storage section stores the correspondence relationship. The obtaining section obtains the detection value from a vehicle-side traveling state detecting section that is different from a member constituting the transmitter. The identifying section is configured to acquire the specific angle at which the transmission data has been transmitted from the correspondence relationship and the detection value that is obtained by the obtaining section upon reception of the transmission data by the receiving section. The identifying section is also configured to identify one of the wheel assemblies to which the transmitter is attached based on the specific angle.

The detection value of the traveling state detecting section varies in accordance with the traveling state of the vehicle. The possible values of the detection value of the traveling state detecting section are divided into a plurality of ranges, and a specific angle is assigned to each range. The correspondence relationship between the ranges and the specific angles is stored in the storage section. Thus, the transmission data is transmitted at the specific angles in accordance with the detection value of the traveling state detecting section. The reception storage section stores the same correspondence relationship as that stored in the storage section. Thus, the identifying section is capable of acquiring the specific angle at which the transmission data has been transmitted based on the detection value obtained from the vehicle-side traveling state detecting section by the obtaining section and the correspondence relationship stored in the reception storage section. The identifying section is allowed to acquire the specific angle even if the transmission data does not include data indicating the angle information. This shortens the data length of the transmission data as compared with the case in which the transmission data includes data indicating the angle information. Accordingly, the power consumption by transmission of the transmission data is reduced.

To achieve the foregoing objective and in accordance with a second aspect of the present invention, a transmitter that is attached to each of a plurality of wheel assemblies is provided. A vehicle includes rotation angle detecting sections that detect rotation angles of the respective wheel assemblies. The transmitter includes a power source of the transmitter, a condition detecting section that is configured to detect a condition of a tire, a traveling state detecting section, a data generating section, a transmitting section, a storage section, and a transmission control section. The traveling state detecting section is configured such that a detection value varies in accordance with a traveling state of the vehicle. The data generating section is configured to generate transmission data that includes tire condition data indicating the condition of the tire detected by the condition detecting section and does not include data indicating the detection value of the traveling state detecting section. The transmitting section is configured to modulate the transmission data, which is generated by the data generating section, and transmit the modulated data. The storage section stores a correspondence relationship in which ranges obtained by dividing possible values of the detection value of the traveling state detecting section are respectively assigned to a plurality of specific angles set for rotation angles of the wheel assemblies. The transmission control section is capable of performing specific angle transmission in which the transmission control section transmits, to a receiver, the transmission data from the transmitting section when detecting that the rotation angle of the wheel assembly is any of the specific angles. The receiver includes a reception storage section that stores the correspondence relationship, an obtaining section that obtains the detection value from a vehicle-side traveling state detecting section that is different from a member constituting the transmitter, and an identifying section that, upon reception of the transmission data, identifies a position of the wheel assembly to which the transmitter is attached based on an angle detection value obtained from the rotation angle detecting section. The transmission control section is configured to, when performing the specific angle transmission, transmit the transmission data when detecting that the rotation angle of the wheel assembly is the specific angle that corresponds to the detection value of the traveling state detecting section.

The transmission data is transmitted at the specific angles in accordance with the detection value of the traveling state detecting section. The reception storage section stores the same correspondence relationship as that stored in the storage section. Thus, the identifying section is capable of acquiring the specific angle at which the transmission data has been transmitted based on the detection value obtained from the vehicle-side traveling state detecting section by the obtaining section and the correspondence relationship stored in the reception storage section. The identifying section is allowed to acquire the specific angle even if the transmission data does not include data indicating the angle information. This shortens the data length of the transmission data as compared with the case in which the transmission data includes data indicating the angle information. Accordingly, the power consumption by transmission of the transmission data is reduced.

In the above-described transmitter, the traveling state detecting section may be an acceleration sensor.

The detection value of the acceleration sensor varies in accordance with the vehicle speed. Thus, the specific angle can be determined based on the detection value of the acceleration sensor.

To achieve the foregoing objective and in accordance with a third aspect of the present invention, a receiver mounted on a vehicle is provided. The vehicle includes rotation angle detecting sections that detect rotation angles of respective wheel assemblies. The receiver includes a receiving section an identifying section, a reception storage section, and an obtaining section. The receiving section is configured to be capable of receiving transmission data from a transmitter capable of transmitting the transmission data when detecting that a rotation angle of the wheel assembly is a specific angle. Upon reception of the transmission data transmitted at the specific angle, the identifying section identifies one of the wheel assemblies to which the transmitter is attached based on an angle detection value obtained from the rotation angle detecting section. The reception storage section stores a correspondence relationship in which ranges obtained by dividing possible values of a detection value that changes in accordance with a rotation speed of the wheel assembly are respectively assigned to a plurality of specific angles set for rotation angles of the wheel assemblies. The obtaining section obtains the detection value from a vehicle-side traveling state detecting section that is different from a member constituting the transmitter. The receiving section is configured to receive the transmission data from the transmitter that transmits the transmission data at the specific angle corresponding to the correspondence relationship. The identifying section is configured to acquire the specific angle at which the transmission data has been transmitted from the correspondence relationship and the detection value that is obtained by the obtaining section upon reception of the transmission data by the receiving section. The identifying section is also configured to identify one of the wheel assemblies to which the transmitter is attached based on the specific angle.

The transmitter transmits transmission data at a plurality of specific angles in accordance with the detection value of the traveling state detecting section. The identifying section is capable of acquiring the specific angle at which the transmission data has been transmitted based on the detection value obtained from the vehicle-side traveling state detecting section by the obtaining section and the correspondence relationship stored in the reception storage section. Thus, it is possible to acquire the specific angle even if the transmission data does not include data indicating the angle information. This shortens the data length of the transmission data as compared with the case in which the transmission data includes data indicating the angle information. Accordingly, the power consumption by transmission of the transmission data is reduced.

Effects of the Invention

The present invention reduces the power consumption by transmission of the transmission data.

BRIEF DESCRIPTION OF THE DRAWINGS

FIG. 4 is a diagram showing the positional relationship between the detection axis of an acceleration sensor and a wheel assembly.

FIG. 5 is a flowchart showing the process executed by a transmission control section when performing a specific angle transmission.

FIG. 6 is a diagram showing the frame format of transmission data.

MODES FOR CARRYING OUT THE INVENTION

A tire condition monitoring system, a transmitter, and a receiver according to an embodiment will now be described.

Figure 1:
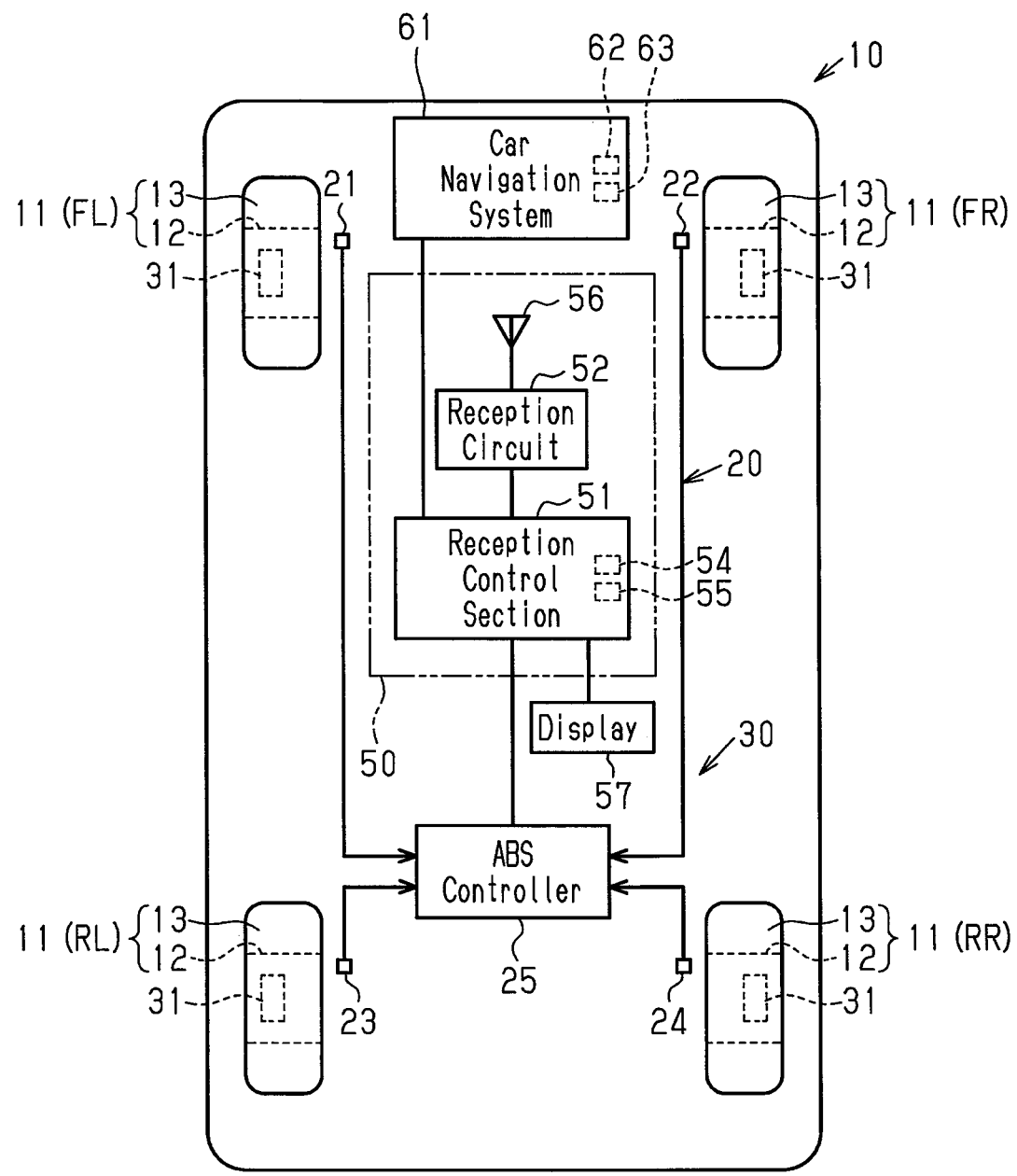
FIG. 1 is a schematic diagram showing the configuration of a tire condition monitoring system.

As shown in FIG. 1, a tire condition monitoring system 30 is mounted on a vehicle 10.

The vehicle 10 includes four wheel assemblies 11. Each of the wheel assemblies 11 includes a wheel 12 and a tire 13 attached to the wheel 12. The wheel assembly 11 on the right front side will be denoted by FR, the wheel assembly 11 on the left front side will be denoted by FL, the wheel assembly 11 on the right rear side will be denoted by RR, and the wheel assembly 11 on the left rear side will be denoted by RL.

The vehicle 10 includes an antilock braking system (ABS) 20. The ABS 20 includes an ABS controller 25 and rotation sensor units 21 to 24, which respectively correspond to the four wheel assemblies 11. The first rotation sensor unit 21 corresponds to the left front wheel assembly FL, and the second rotation sensor unit 22 corresponds to the right front wheel assembly FR. The third rotation sensor unit 23 corresponds to the left rear wheel assembly RL, and the fourth rotation sensor unit 24 corresponds to the right rear wheel assembly RR. The ABS controller 25 includes a microcomputer and the like and acquires the rotation angle of each of the wheel assemblies 11 based on signals from the rotation sensor units 21 to 24. The rotation sensor units 21 to 24 are arranged to be outside the tires 13.

Figure 2:
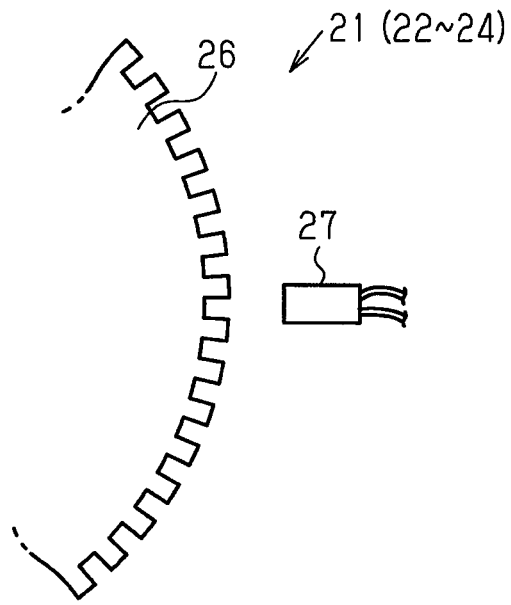
FIG. 2 is a schematic diagram showing the configuration of a rotation sensor unit.

As shown in FIG. 2, each of the rotation sensor units 21 to 24, which serve as rotation angle detecting sections, includes a gear 26, which rotates integrally with the wheel assembly 11, and a detector 27 arranged to face the outer circumferential surface of the gear 26. The gear 26 has teeth arranged on the outer circumferential surface at constant angular intervals. The gear 26 has forty-eight teeth. The detector 27 detects pulses generated by rotation of the gear 26. The ABS controller 25 is connected to the detector 27 by wire and obtains the rotation angle of each of the wheel assemblies 11 based on a pulse count value, which is an angle detection value of each of the detectors 27. Specifically, the ABS controller 25 counts rising edges and falling edges of pulses generated in the detector 27. The ABS controller 25 calculates, as the pulse count value, the remainder when the counted number of pulses is divided by the number of pulses per rotation of the gear 26 (ninety-six). Also, the degree of rotation of the gear 26 per pulse count is obtained by dividing 360 degrees by the number of pulses generated in the detector 27 while the wheel assembly 11 rotates one rotation. In this manner, the rotation angle of the wheel assembly 11 is obtained from the pulse count value. The pulse count value is a value within the range from 0 to 95. The ABS controller 25 calculates the speed of the vehicle 10 from the frequency of the pulses generated in the detector 27.

The tire condition monitoring system 30 will now be described.

As shown in FIG. 1, the tire condition monitoring system 30 includes transmitters 31 and a receiver 50. Each transmitter 31 is attached to one of the four wheel assemblies 11 of the vehicle 10. The receiver 50 is installed in the body of the vehicle 10. The transmitter 31 is attached to the wheel assembly 11 so as to be arranged in the inner space of the tire 13. The transmitter 31 is fixed to the tire valve, the wheel 12, or the tire 13. The transmitter 31 detects the condition of the corresponding tire 13 and wirelessly transmits transmission data including detected information of the tire 13 to the receiver 50. The tire condition monitoring system 30 monitors the condition of the tire 13 by receiving the transmission data transmitted from the transmitter 31 through the receiver 50.

Figure 3:
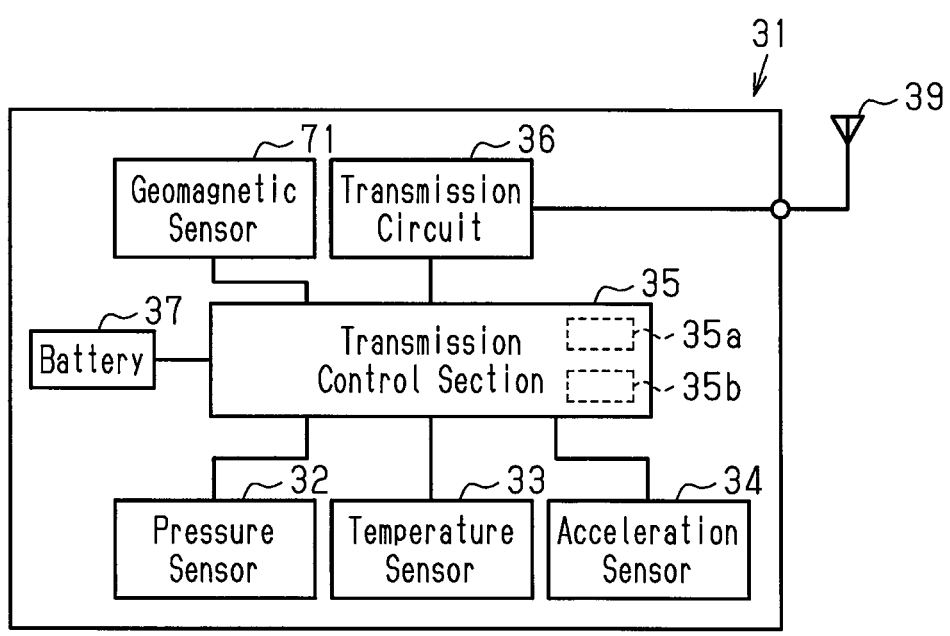
FIG. 3 is a schematic diagram showing the configuration of a transmitter.

As shown in FIG. 3, each of the transmitters 31 includes a pressure sensor 32, a temperature sensor 33, an acceleration sensor 34, a transmission control section 35, a transmission circuit 36, a battery 37, and a transmission antenna 39. The transmitter 31 is driven by power supplied from the battery 37, and the transmission control section 35 controls operation of the transmitter 31 in a centralized manner. The battery 37, which is the power source of the transmitter 31, may be a primary battery or a power storage device such as a rechargeable battery or a capacitor.

The pressure sensor 32 detects the air pressure of the corresponding tire 13. The temperature sensor 33 detects the temperature inside the corresponding tire 13.

As shown in FIG. 4, the acceleration sensor 34 includes a detection axis 34a, and detects acceleration in the axial direction of the detection axis 34a. The acceleration sensor 34 is attached to the wheel assembly 11 so as to detect the centrifugal force generated by rotation of the wheel assembly 11. For example, the acceleration sensor 34 is attached to the wheel assembly 11 such that the detection axis 34a is directed in the vertical direction when the transmitter 31 is located at the lowest position in the wheel assembly 11. The acceleration sensor 34 may be a uniaxial acceleration sensor 34 or a multiaxial acceleration sensor 34 as long as it is capable of detecting at least the centrifugal force. The pressure sensor 32, which detects the pressure in the tire 13, and the temperature sensor 33, which detects the temperature in the tire 13, correspond to condition detecting sections.

As shown in FIG. 3, the transmission control section 35 includes a microcomputer or the like including a CPU 35a and a storage section 35b, which includes a RAM, and a ROM. The transmission control section 35 has a timing function. The timing function is implemented by, for example, a timer or a counter. The transmission control section 35 may include dedicated hardware (application specific integrated circuit: ASIC) that executes at least part of various processes. That is, the transmission control section 35 may be circuitry including 1) one or more processors that operate according to a computer program (software), 2) one or more dedicated hardware circuits such as an ASIC, or 3) a combination thereof. The processor includes a CPU and memories such as a RAM, a ROM, and the like. The memories store program codes or instructions configured to cause the CPU to execute processes. The memories, or computer readable media, include any type of media that are accessible by general-purpose computers and dedicated computers.

The storage section 35b stores an ID code indicating individual identification information of each of the transmitters 31. For illustrative purposes, the ID code of the transmitter 31 attached to the left front wheel assembly FL is denoted by FLID, the ID code of the transmitter 31 attached to the right front wheel assembly FR is denoted by FRID, the ID code of the transmitter 31 attached to the left rear wheel assembly RL is denoted by RLID, and the ID code of the transmitter 31 attached to the right rear wheel assembly RR is denoted by RRID. The storage section 35b stores various programs for controlling the transmitter 31.

The transmission control section 35 generates transmission data and outputs the generated transmission data to the transmission circuit 36. The transmission data is digital data and is a data string of binary numbers. The transmission circuit 36 modulates the transmission data. The modulated transmission data is transmitted from the transmission antenna 39 as a wireless signal. The wireless signal is a signal including the transmission data. The wireless signal is transmitted as a signal of an RF band, for example, a 315 MHz band or a 434 MHz band. The transmission control section 35 corresponds to a data generating section that generates transmission data. The transmission circuit 36 corresponds to a transmitting section that transmits the transmission data.

The transmitter 31 is capable of executing normal transmission, by which the transmission data is transmitted regardless of the rotation angle of the wheel assembly 11, and specific angle transmission, by which the transmission data is transmitted when the rotation angle of the wheel assembly 11 is a predetermined specific angle.

In the normal transmission, the transmission data is transmitted from the transmitter 31 at a predetermined interval. The predetermined interval is set to, for example, ten seconds to several tens of seconds.

The specific angle transmission is performed, for example, when the vehicle 10 has been in a stopped state continuously for a predetermined time or longer. The predetermined time is set to time longer than time required for changing the positions of the wheel assemblies 11 such as in tire rotations or time required for replacing the wheel assemblies 11. The predetermined time is set to, for example, several tens of minutes to several hours.

Whether the vehicle 10 is traveling can be determined based on the acceleration detected by the acceleration sensor 34. The centrifugal acceleration acting on the acceleration sensor 34 increases as the vehicle speed increases. If the acceleration detected by the acceleration sensor 34 is greater than or equal to a travel determination threshold, the transmission control section 35 determines that the vehicle 10 is traveling. If the acceleration detected by the acceleration sensor 34 is lower than the travel determination threshold, the transmission control section 35 determines that the vehicle 10 is in a stopped state. The travel determination threshold is set to a value greater than the acceleration detected by the acceleration sensor 34 when the vehicle 10 is in a stopped state while taking factors such as tolerances into consideration.

In the specific angle transmission, the transmitter 31 transmits the transmission data when the rotation angle of the wheel assembly 11 is detected to be the predetermined specific angle. Specifically, the transmission control section 35 transmits the transmission data from the transmitter 31 when the specific angle is detected and a predetermined time (for example, ten seconds to several tens of seconds) has elapsed since the last transmission of the transmission data. In the present embodiment, multiple specific angles are set. The set specific angles include a first angle, which corresponds to a state in which the transmitter 31 is located at the highest position in the wheel assembly 11, and a second angle, which corresponds to a state in which the transmitter 31 is located at the lowest position in the wheel assembly 11. When the first angle is defined as the origin (0°), the second angle is 180°.

The process executed by the transmission control section 35 when performing the specific angle transmission will now be described.

As shown in FIG. 5, the transmission control section 35 obtains measured values from the pressure sensor 32 and the temperature sensor 33 in step S1. After obtaining a measured value from the pressure sensor 32 and a measured value of the temperature sensor 33, the transmission control section 35 generates transmission data of a predetermined frame format in step S2.

As shown in FIG. 6, the frame format includes a preamble, an identifying code, an ID code, a fixed bit, pressure data, temperature data, a status code, an error detection code, and a stop bit. The pressure data and the temperature data are tire condition data indicating the condition of the tire 13.

As shown in FIG. 5, the transmission control section 35 determines the specific angle based on the speed of the vehicle 10 in step S3. First, the transmission control section 35 obtains acceleration from the acceleration sensor 34. Since the acceleration of the acceleration sensor 34 increases as the speed of the vehicle 10 increases, the speed of the vehicle 10 can be calculated from the acceleration. Specifically, the storage section 35b of the transmission control section 35 stores the radius of the tire 13 and the radius of the rim of the wheel 12. The transmission control section 35 calculates the speed of the vehicle 10 from the acceleration detected by the acceleration sensor 34 and information of the radius of the tire 13 and the radius of the rim of the wheel 12, which are stored in the storage section 35b.

Figures 7, 8:
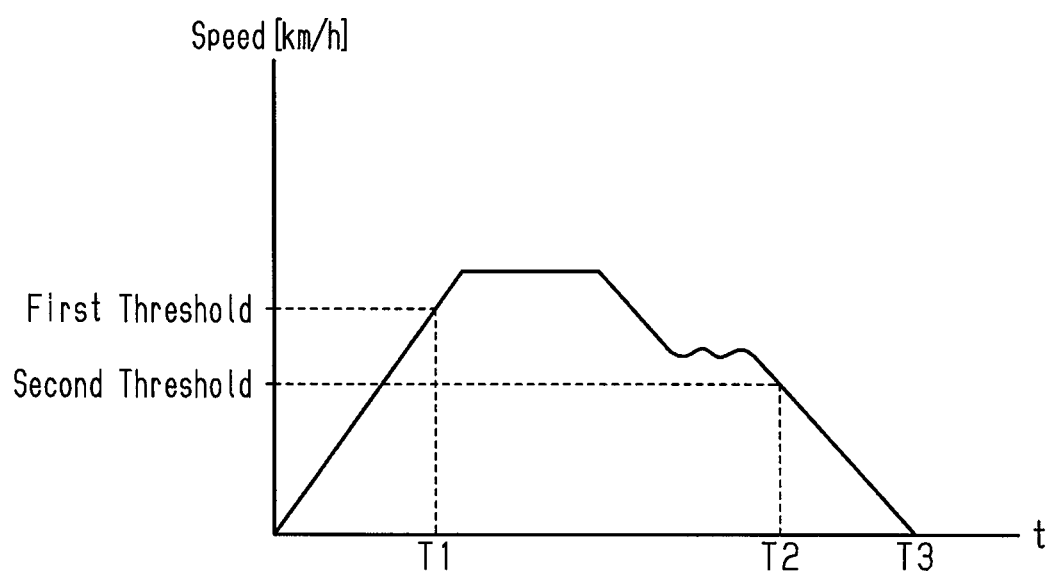
FIG. 7 is a diagram in which the possible values of the vehicle speed are divided into a plurality of ranges, and specific angles are assigned to the respective ranges.
FIG. 8 is a diagram showing the relationship between a first threshold and a second threshold.

As shown in FIGS. 7 and 8, the range of the possible speeds of the vehicle 10 is divided into two ranges. A specific angle is assigned to each range. Using 40 km/h as a threshold, the range of speeds higher than or equal to 0 km/h and lower than 40 km/h is defined as a first range, and the range of speeds higher than or equal to 40 km/h is defined as a second range. The first angle is assigned to the first range. The second angle is assigned to the second range. Hysteresis is provided for the threshold. Specifically, two different thresholds are provided: a first threshold for switching from the first angle to the second angle and a second threshold for switching from the second angle to the first angle. The threshold for dividing the range of the possible speeds of the vehicle 10 may be any value.

As shown in FIG. 8, the first threshold is a value (40 km/h) that separates the first range and the second range from each other, and the second threshold is lower than the first threshold. The transmission control section 35 sets the specific angle to the first angle from when the vehicle 10 starts traveling from a stopped state to a point in time T1, when the speed becomes higher than or equal to the first threshold. When the speed becomes higher than or equal to the first threshold at the point in time T1, the transmission control section 35 sets the specific angle to the second angle. The transmission control section 35 maintains the specific angle at the second angle until a point in time T2, when the speed falls below the second threshold. When the speed falls below the second threshold at the point in time T2, the transmission control section 35 sets the specific angle to the first angle.

The transmission control section 35 determines the specific angle in accordance with the speed of the vehicle 10. The traveling state is the speed of the vehicle 10. The acceleration, which is the detection value of the acceleration sensor 34, changes in accordance with the speed of the vehicle 10. Therefore, the acceleration sensor 34 corresponds to the traveling state detecting section. The speed of the vehicle 10 is calculated from the acceleration of the acceleration sensor 34. Accordingly, the detection value of the traveling state detecting section includes both of a value directly detected by the traveling state detecting section and a value that can be calculated from the directly detected value. It can be said that, since the data that indicates the speed of the vehicle 10 is not included in the transmission data, the transmission control section 35 determines the specific angle based on data that is not included in the transmission data. The acceleration detected by the acceleration sensor 34 and the transmission control section 35, which calculates the speed of the vehicle 10 by using the detected acceleration, can be regarded as the traveling state detecting section.

Next, as shown in FIG. 5, the transmission control section 35 transmits, in step S4, the transmission data upon detection of the specific angle determined in step S3. Whether the transmitter 31 is located at a position corresponding to the specific angle can be detected based on the acceleration detected by the acceleration sensor 34. As described above, the direction in which the detection axis 34a extends is the same as the direction in which the centrifugal force acts regardless of the rotation angle of the wheel assembly 11. Thus, the acceleration sensor 34 detects the centrifugal acceleration regardless of the rotation angle of the wheel assembly 11. In contrast, the gravitational acceleration always acts in the vertical direction. Thus, in a case in which the detection axis 34a is not directed in the vertical direction, the acceleration sensor 34 detects a component force of the gravitational acceleration. The acceleration sensor 34 detects an acceleration obtained by adding the gravitational acceleration to the centrifugal acceleration.

Unless the vehicle 10 is abruptly accelerated or stopped, the centrifugal acceleration changes only slightly in one rotation of the wheel assembly 11. Accordingly, the acceleration that changes in one rotation of the wheel assembly 11 is deemed to be the gravitational acceleration. Thus, a state in which the rotation angle of the wheel assembly 11 matches with the specific angle can be detected by using changes in the gravitational acceleration. When only the gravitational acceleration is considered, the gravitational acceleration changes in a range between +1 [G] and −1 [G] in one rotation of the wheel assembly 11. In a case in which the detection axis 34a is directed in the vertical direction when the transmitter 31 is at the lowest position, the gravitational acceleration is +1G when the transmitter 31 is located at the lowest position of the wheel assembly 11, and the gravitational acceleration is −1G when the transmitter 31 is located at the highest position of the wheel assembly 11.

By using these changes, the transmission control section 35 is capable of transmitting the transmission data upon detection of the specific angle.

The "specific angle" is the rotation angle of the wheel assembly 11 including an acceptable range. Errors can occur between the specific angle and the rotation angle of the wheel assembly 11 when the transmission data is actually transmitted due to various factors such as the frequency at which the transmission control section 35 obtains the acceleration and detection errors of the acceleration sensor 34. The "specific angle" does not only indicate an angle exactly matching with the specific angle but includes a permissible range with errors taken into consideration.

Through the above-described process, the transmission data is transmitted at the specific angle that corresponds to the speed of the vehicle 10. The transmission data is transmitted at both of the first angle and the second angle in accordance with the speed of the vehicle 10.

The receiver 50 will now be described.

As shown in FIG. 1, the receiver 50 includes a reception control section 51, a reception circuit 52, and a reception antenna 56. The reception control section 51 is connected to a display 57 mounted on the vehicle 10. The reception control section 51 includes a microcomputer or the like including a reception CPU 54 and a reception storage section 55, which includes a ROM, a RAM and the like. The reception control section 51 includes a timing function. The timing function is implemented by, for example, a timer or a counter. The reception control section 51 may include dedicated hardware (application specific integrated circuit: ASIC) that executes at least part of various processes. That is, the reception control section 51 may be circuitry including 1) one or more processors that operate according to a computer program (software), 2) one or more dedicated hardware circuits such as an ASIC, or 3) a combination thereof. The processor includes a CPU and memories such as a RAM, and a ROM. The memories store program codes or instructions configured to cause the CPU to execute processes. The memories, or computer readable media, include any type of media that are accessible by general-purpose computers and dedicated computers.

The reception circuit 52 demodulates wireless signals received from each of the transmitters 31 via the reception antenna 56 and outputs the transmission data from the transmitters 31 to the reception control section 51. The reception circuit 52 corresponds to the receiving section.

The reception control section 51 acquires the pressure in the tire 13 and the temperature in the tire 13, which represent the condition of the tire 13, based on the transmission data from the reception circuit 52. When there is an anomaly in the tire 13, the reception control section 51 displays warning on the display 57.

The reception storage section 55 stores the ID codes of the transmitters 31 mounted on the four wheel assemblies 11. With this, the transmitters 31 are associated with the receiver 50.

In some cases, it is desired to determine which one of the four wheel assemblies 11 includes the tire 13 to which the received transmission data corresponds. For example, in some cases, it is desired to display on the display 57 the wheel assembly 11 in which a pressure anomaly has occurred in the tire 13. In other cases, it is desired to display on the display 57 the pressures of the tires 13 corresponding to the respective positions of the wheel assemblies 11. In such cases, it is required to determine one of the four wheel assemblies 11 to which the received transmission data corresponds. In other words, the reception control section 51 needs to associate the ID codes of the respective transmitters 31 with the positions of the wheel assemblies 11.

A wheel assembly position identifying process for identifying one of the four wheel assemblies 11 to which each transmitter 31 is attached will now be described. The wheel assembly position identifying process is executed when the vehicle 10 is activated by a start switch, which switches the state of the vehicle 10 between the activated state and the stopped state. The activated state of the vehicle 10 refers to a state in which the vehicle 10 can travel through operation of the accelerator pedal. The stopped state of the vehicle 10 refers to a state in which the vehicle 10 will not travel even if the accelerator pedal is operated.

Figure 9:
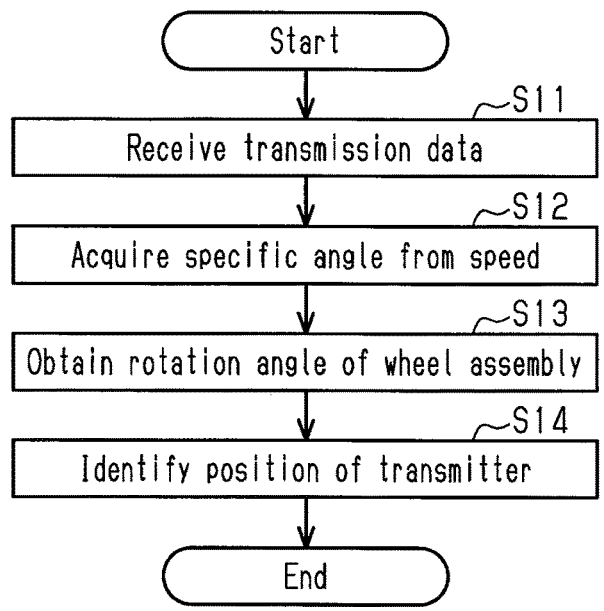
FIG. 9 is a flowchart showing a wheel assembly position identifying process executed by the reception control section.

As shown in FIG. 9, the reception control section 51 receives transmission data in step S11. Next, in step S12, the reception control section 51 acquires the specific angle at which the received transmission data has been transmitted based on the correspondence relationship between the speed of the vehicle 10 and the specific angle. First, the reception control section 51 obtains the speed of the vehicle 10 from the ABS controller 25. The reception storage section 55 stores the same correspondence relationship as that stored in the storage section 35b of the transmitter 31. That is, the reception storage section 55 stores the correspondence relationship in which each of the ranges obtained by dividing possible values of the speed of the vehicle 10 is assigned to a specific angle. As described above, the first angle is assigned to the first range, which corresponds to speeds higher than or equal to 0 km/h and lower than 40 km/h, and the second angle is assigned to the second range, which corresponds to speeds higher than or equal to 40 km/h. The reception control section 51 acquires the specific angle at which the transmission data has been transmitted based on the speed of the vehicle 10.

The reception control section 51 is the obtaining section that obtains the speed of the vehicle 10 from the ABS controller 25. The rotation sensor units 21 to 24 are vehicle-side traveling state detecting sections that detect the speed of the vehicle 10. The speed of the vehicle 10 is calculated from the angle detection values of the rotation sensor units 21 to 24. Accordingly, the detection value of the vehicle-side traveling state detecting section includes both of a value directly detected by the vehicle-side traveling state detecting section and a value that can be calculated from the directly detected value. It can be said that the reception control section 51 obtains the detection values of the rotation sensor units 21 to 24 via the ABS controller 25. The detection values of the rotation sensor units 21 to 24 and the ABS controller 25, which calculates the speed of the vehicle 10 by using the detection values, can be regarded as the vehicle-side traveling state detecting section. The rotation sensor units 21 to 24 are members different from the members constituting the transmitters 31.

The speed of the vehicle 10 can be detected by both of the transmission control section 35 and the reception control section 51. The specific angle is determined in accordance with the traveling state that can be commonly acquired by the transmission control section 35 and the reception control section 51. Thus, the specific angle at which the transmission data has been transmitted can be acquired without including data indicating the angle information in the transmission data.

Next, in step S13, the reception control section 51 obtains the pulse count value of each of the rotation sensor units 21 to 24 upon reception of the transmission data. The processes of step S12 and S13 may be executed either in order of step S12 and step 13 or in order of step S13 and step S12. Also, the process of step S12 and the process of step S13 may be executed simultaneously.

Next, in step S14, the reception control section 51 performs position identification to identify one of the four wheel assemblies to which each of the transmitters 31 is attached. The position identification is performed by obtaining and collecting pulse count values upon reception of the transmission data each time the transmission data is received. The number of rotations of the wheel assemblies 11 varies, for example, due to the influence of the differential gear. Thus, the relative positions of the transmitters 31 attached to the wheel assemblies 11 change as the vehicle 10 travels. On the other hand, in a case in which the transmitters 31 transmit the transmission data at the specific angle, the rotation angle of each of the four wheel assemblies 11 is synchronized with the rotation angle at which the transmission data from one of the four transmitters 31 is transmitted. Thus, in a case in which the transmitters 31 transmit the transmission data at the specific angle, if the pulse count value is obtained upon reception of the transmission data, one of the rotation sensor units 21 to 24 has a small variation of the pulse count value in correspondence with each transmitter 31. It is thus possible to identify one of the four wheel assemblies to which each of the transmitters 31 is attached based on the variation of the pulse count values collected each time the transmission data is obtained.

In a case in which the transmission data is transmitted at multiple specific angle, the pulse count values obtained from the rotation sensor units 21 to 24 differ from each other depending on at which of two specific angles the transmission data has been transmitted. The reception control section 51 thus needs to identify the position of the transmitter 31 after acquiring the specific angle at which the transmission data has been transmitted.

There are various types of control for performing the position identification of the transmitter 31. For example, the pulse count value that is obtained upon reception of the transmission data transmitted at the first angle and the pulse count value that is obtained upon reception of the transmission data transmitted at the second angle may be collected separately. Also, forty-eight may be added to or subtracted from the pulse count value that is obtained upon reception of the transmission data transmitted at the first angle or the pulse count value that is obtained upon reception of the transmission data transmitted at the second angle. In this case, addition or subtraction of the pulse count value (forty-eight) that corresponds to the difference between the first angle and the second angle allows for identification of the position of the transmitter 31 by assuming that the transmission data has been transmitted at one single specific angle. In this case, if the receiver 50 receives all the transmission data, the pulse count values are collected at twice the speed of a case in which the pulse count values are independently collected at the first angle and the second angle. This shortens the time required to identify the position of the transmitter 31.

Figure 10:
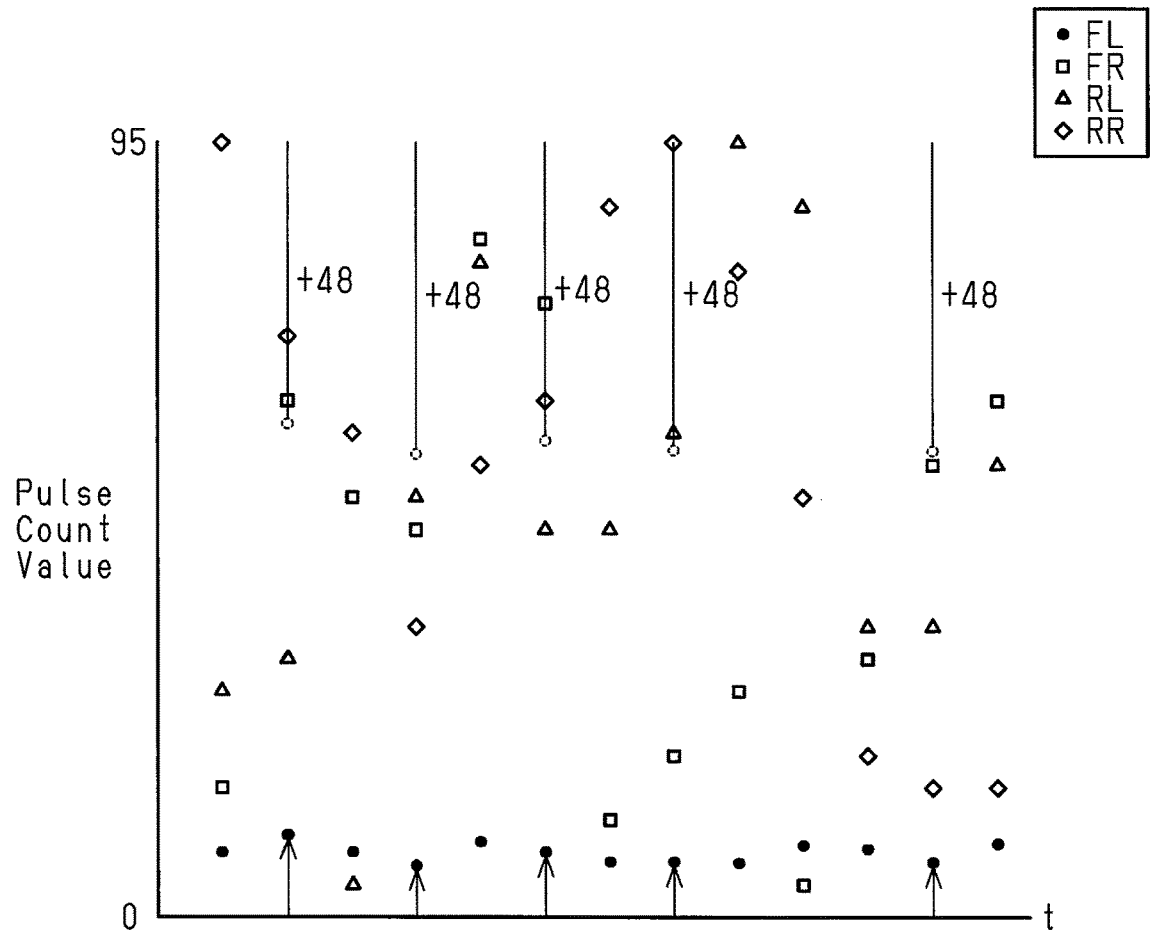
FIG. 10 is a diagram showing an example of the pulse count values obtained upon reception of transmission data transmitted from the transmitter mounted on the left front wheel assembly.

It is now assumed that, as shown in FIG. 10, the transmitter 31 attached to the left front wheel assembly FL has transmitted transmission data multiple times at the first angle and the second angle. The reception control section 51 collects the pulse count value that is obtained upon reception of the transmission data transmitted at the first angle and the value obtained by adding forty-eight to the pulse count value that is obtained upon reception of the transmission data transmitted at the second angle.

In the example of FIG. 10, the variation of the pulse count value detected by the first rotation sensor unit 21 corresponding to the left front wheel assembly FL is the smallest. Therefore, the transmitter 31 of the FLID is identified as that attached to the left front wheel assembly FL. Also, the reception control section 51 corresponds to an identifying section that identifies one of the four wheel assemblies 11 to which each transmitter 31 is attached. Thus, the reception control section 51 identifies the wheel assemblies 11 to which the transmitters 31 of the FFID, RLID, and RRID are respectively attached.

By executing the process of step S14, the reception control section 51 identifies one of the four wheel assemblies 11 to which each transmitter 31 is attached. The reception control section 51 stores the four ID codes and the positions of the respective wheel assemblies 11 in the reception storage section 55 while associating the ID codes and the positions with each other. The processes of the steps S11 to S14 are repeated each time the transmission data is received until the correspondence relationship between all the transmitters 31 and the wheel assemblies 11 are identified. When the four ID codes are associated with the positions of the wheel assemblies 11 through the process of step S14, the reception control section 51 ends the wheel assembly position identifying process.

Next, operation of transmitters 31, the receiver 50, and the tire condition monitoring system 30 will be described.

The acceleration that is detected by the acceleration sensor 34 changes in accordance with the speed of the vehicle 10. The transmitters 31 transmit transmission data at the first angle and the second angle in accordance with the speed that is calculated from the acceleration of the acceleration sensors 34. Based on the speed of the vehicle 10 obtained from the ABS controller 25, the reception control section 51 determines whether the specific angle at which the transmission data has been transmitted is the first angle or the second angle, thereby identifying the positions of the transmitters 31. Since the transmission data is transmitted at multiple specific angles, the influence of the null points is avoided.

In order to allow the receiver 50 to identify the positions of the transmitters 31 while avoiding the influence of the null points, the transmission data may be transmitted alternately at the first angle and the second angle. If the receiver 50 can recognize that the transmission data is alternately transmitted at the first angle and the second angle, the receiver 50 can collect the pulse count values for the transmission data transmitted at the first angle and for the transmission data transmitted at the second angle. Further, in some cases, the transmission data cannot be received due to the communication environment or the like, and therefore transmission data transmitted at the first angle (or the second angle) is received successively. In this case also, since the interval of transmission of the transmission data is known, it is possible to recognize that the transmission data transmitted at the same specific angle is received two consecutive times in a case in which the reception interval of the transmission data is approximately twice the transmission interval of the transmission data.

However, in a case in which the transmission data cannot be received for several consecutive times, it is difficult to identify one of the four wheel assemblies 11 to which each of the transmitters 31 is attached. This is because it is impossible to determine whether the received transmission data has been transmitted at the first angle or the second angle after the transmission data has been unable to be received for several consecutive times due to the precision of the timing function of the reception control section 51 or the like.

In the present embodiment, however, the possible values of the speed of the vehicle 10 are divided into the first range and the second range, and a specific angle is assigned to each range. The correspondence relationship between the ranges and the specific angles is stored both in the storage section 35b of the transmitter 31 and the reception storage section 55 of the receiver 50. Therefore, even if the reception control section 51 cannot receive the transmission data for several consecutive times, the reception control section 51 is capable of determining whether the transmission data has been transmitted at the first angle or the second angle based on the speed of the vehicle 10.

Also, in a case in which data indicating angle information is included in the transmission data, if the data indicating the angle information and the error detection code both have an error, the reception control section 51 may erroneously recognize the specific angle at which the transmission data has been transmitted.

In contrast, the specific angle is determined based on a detection value that is not included in the transmission data in the present embodiment. This prevents erroneous recognition of the specific angle due to an error in the transmission data.

The present embodiment has the following advantages.

(1) The possible values of the speed of the vehicle 10 are divided into the first range and the second range, and a specific angle is assigned to each range. The correspondence relationship between the specific angles and the ranges is stored in the storage section 35b. The transmission control section 35 transmits transmission data at the first angle and the second angle in accordance with the correspondence relationship. The reception storage section 55 stores the same correspondence relationship as that stored in the storage section 35b. Thus, the reception control section 51 is capable of acquiring the specific angle at which the transmission data has been transmitted from the speed of the vehicle 10 obtained from the ABS controller 25 and the correspondence relationship stored in the reception storage section 55. The reception control section 51 uses the acquired specific angles to identify the wheel assemblies 11 to which the respective transmitters 31 are attached. The reception control section 51 is capable of acquiring the specific angle even if the transmission data does not include data indicating the angle information. This shortens the data length of the transmission data as compared with the case in which the transmission data includes data indicating the angle information. This reduces the consumption of the power by transmission of the transmission data, thereby extending the life of the battery 37.

(2) The transmission control section 35 determines the specific angle at which it transmits the transmission data in accordance with the speed of the vehicle 10 calculated from the acceleration detected by the acceleration sensor 34. The transmission control section 35 does not include data indicating angle information in the transmission data. This shortens the data length of the transmission data as compared with the case in which the transmission data includes data indicating the angle information. This reduces the consumption of the power by transmission of the transmission data, thereby extending the life of the battery 37.

(3) The acceleration sensor 34 is used as the traveling state detecting section. The detection value of the acceleration sensor 34 varies in accordance with the speed of the vehicle 10. Thus, the specific angle can be determined based on the detection value of the acceleration sensor 34. In the present embodiment, the rotation angle of the wheel assembly 11 is detected to be at the specific angle by using the acceleration detected by the acceleration sensor 34. Thus, the acceleration sensor 34, which is configured to detect that the rotation angle of the wheel assembly 11 becomes the specific angle, can also be used as a member configured to determine the specific angle at which the transmission of the transmission data is transmitted.

(4) The reception control section 51 is capable of acquiring the specific angle at which the transmission data has been transmitted from the speed of the vehicle 10 obtained from the ABS controller 25 and the correspondence relationship stored in the reception storage section 55. Thus, the reception control section 51 is capable of acquiring the specific angle even if the transmission data does not include data indicating the angle information. This shortens the data length of the transmission data as compared with the case in which the transmission data includes data indicating the angle information. This reduces the consumption of the power by transmission of the transmission data, thereby extending the life of the battery 37.

(5) In some cases, an add-on of a specific angle transmitting feature is installed in the transmitter 31 that cannot transmit the transmission data at the specific angle, in other words, in the transmitter 31 that cannot cause the receiver 50 to identify the position of the transmitter 31. In this case, if the angle information is included in the transmission data in order to cause the receiver 50 to acquire the specific angle, the frame format must be changed. In contrast, in a case in which the transmission data is transmitted at specific angle that corresponds to one of the ranges obtained by dividing possible values of the speed of the vehicle 10, the receiver 50 is allowed to acquire the specific angle at which the transmission data has been transmitted by storing the correspondence relationship in which the specific angles are assigned to the respective ranges of the speed of the vehicle 10 both in the storage section 35b of the transmitter 31 and the reception storage section 55 of the receiver 50. This allows the add-on of a specific angle transmitting feature to be installed in the transmitter 31 without changing the frame format.

The present embodiment may be modified as follows. The present embodiment and the following modifications can be combined as long as the combined modifications remain technically consistent with each other.

The traveling state detecting section and the vehicle-side traveling state detecting section may have a detection value that varies in accordance with the traveling direction of the vehicle 10. As shown in FIG. 1, the vehicle 10 is equipped with a car navigation system 61. The car navigation system 61 includes a GPS receiver 62, which receives GPS information transmitted from GPS satellites, and a navigation control section 63, which, for example, identifies the position of the vehicle 10 based on the GPS information. The navigation control section 63 compares the current position of the vehicle 10 with positions in the past of the vehicle 10 to detect the traveling direction of the vehicle 10.

As shown in FIG. 4, the transmitter 31 includes a geomagnetic sensor 71. The geomagnetic sensor 71 detects an angle deviation in the horizontal direction from the magnetic north. The detected angle deviation is a detection value of the geomagnetic sensor 71. The detection value of the geomagnetic sensor 71 varies in accordance with the traveling direction of the vehicle 10. The transmission control section 35 is capable of acquiring the traveling direction of the vehicle 10 from the detection value of the geomagnetic sensor 71. In this case, the traveling state is the traveling direction of the vehicle 10.

The transmission control section 35 determines the specific angle to transmit the transmission data in accordance with the detection value of the geomagnetic sensor 71. That is, the storage section 35b stores the correspondence relationship in which the traveling directions of the vehicle 10 are assigned to the specific angles. For example, in a case in which the detection value of the geomagnetic sensor 71 is in a range corresponding to the north and the south, the traveling direction of the vehicle 10 is assigned to a first angle. Also, in a case in which the detection value of the geomagnetic sensor 71 is in a range corresponding to the east and the west, the traveling direction of the vehicle 10 is assigned to a second angle. That is, 360° in the horizontal direction is divided into four ranges, and a specific angle is assigned to each range.

The transmission control section 35 transmits transmission data upon detection of the specific angle. The reception control section 51 obtains, from the car navigation system 61, the traveling direction of the vehicle 10 at the time of the reception of the transmission data. The reception storage section 55 stores the same correspondence relationship as that stored in the storage section 35b. This allows the reception control section 51 to acquire the specific angle at which the transmission has been transmitted from the traveling direction of the vehicle 10.

As long as the transmission control section 35 is capable of obtaining a detection value, the traveling state detecting section may be provided, for example, at any position in the tire 13. The vehicle-side traveling state detecting section is simply required to be a member different from the member constituting the transmitter 31, and to be located within the vehicle 10 but outside the tire 13, so that the reception control section 51 is allowed to obtain a detection value. For example, the vehicle-side traveling state detecting section is simply required to be provided in the body of the vehicle 10 or in a member provided in the body of the vehicle 10. A state in which the vehicle-side traveling state detecting section is provided in the vehicle 10 is simply required to be a state in which the vehicle-side traveling state detecting section is movable together with the vehicle 10. For example, the vehicle-side traveling state detecting section may be a GPS device carried by an occupant of the vehicle 10 or a GPS device incorporated in the receiver 50. The GPS device may be the one incorporated in a mobile information terminal device such as a smartphone, a mobile phone, or a portable navigation device.

The specific angle may be determined in accordance with the rotation period of the wheel assembly 11 instead of the speed of the vehicle 10. The rotation period of the wheel assembly 11 refers to the time the wheel assembly 11 takes to complete one rotation. The rotation period becomes shorter as the speed increases. The transmission control section 35 is capable of acquiring the rotation period of the wheel assembly 11 from the frequency (period) of the gravitational acceleration. Since the gravitational acceleration changes in a range between +1 [G] and −1 [G] while the wheel assembly 11 rotates one rotation, the period of the gravitational acceleration and the rotation period of the wheel assembly 11 match with each other. The storage section 35b of the transmission control section 35 stores the correspondence relationship in which a specific angle is assigned to each of the ranges obtained by dividing possible values of the rotation period of the wheel assembly 11. The transmission control section 35 determines the specific angle based on the correspondence relationship stored in the storage section 35b.

The ABS controller 25 is capable of calculating the rotation period of the wheel assembly 11 from the frequency of the pulses (the number of pulses per second). The reception control section 51 acquires the rotation period of the wheel assembly 11 by obtaining the rotation period of the wheel assembly 11 from the ABS controller 25. The reception storage section 55 stores the correspondence relationship between the rotation period of the wheel assembly 11 and the specific angles. The reception control section 51 acquires the specific angle at which the transmission data has been transmitted from the correspondence relationship.

Likewise, the specific angle may be determined in accordance with the number of rotations of the wheel assembly 11 instead of the speed of the vehicle 10. The number of rotations of the wheel assembly 11 refers to the number of rotations per unit time of the wheel assembly 11, which is, for example, the number of rotations per second of the wheel assembly [$s^{-1}$]. The transmission control section 35 is capable of calculating the number of rotations of the wheel assembly 11 from the period of the gravitational acceleration. The ABS controller 25 is capable of calculating the number of rotations of the wheel assembly 11 from the period of the pulses.

The ABS controller 25 calculates the rotation period and the number of rotations of the wheel assembly 11 separately for each of the rotation sensor units 21 to 24. Thus, the reception control section 51 separately identifies whether the specific angle of each wheel assembly 11 is the first angle or the second angle. Specifically, the reception control section 51 identifies the position of the transmitter 31 by identifying whether the pulse count value obtained from each of the rotation sensor unit 21 to 24 has been obtained at the first angle or the second angle. When the speed of the vehicle 10 is used, the reception control section 51 may calculate the speed of the vehicle 10 for each of the wheel assemblies 11 to identify whether the specific angle of each wheel assembly 11 is the first angle or the second angle.

In the embodiment, the range of the possible speeds of the vehicle 10 may be divided into three or more ranges. For example, the range of speeds higher than or equal to 0 km/h and lower than 20 km/h may be defined as a first range, the range of speeds higher than or equal to 20 km/h and lower than 40 km/h may be defined as a second range, the range of speeds higher than or equal to 40 km/h and lower than 60 km/h may be defined as a third range, and the range of speeds higher than or equal to 60 may be defined as a fourth range.

For example, the first angle is assigned to the first range and the third range, and the second angle is assigned to the second range and the fourth range. Alternatively, the first angle may be assigned to the first range, the second angle may be assigned to the second range, a third angle may be assigned to the third range, and a fourth angle may be assigned to the fourth range. That is, the same specific angle may be assigned to two ranges, or different specific angles may be assigned to the respective ranges. The third angle is a specific angle different from the first angle and the second angle, and is, for example, 90°. The fourth angle is a specific angle different from the first angle, the second angle, and the third angle, and is, for example, 270°.

The transmission control section 35 may calculate the speed of the vehicle 10 from the frequency of the gravitational acceleration. The frequency of the gravitational acceleration can be calculated by, for example, using the period of the gravitational acceleration.

The speed of the vehicle 10 may be checked again after the process of step S3 and before the process of step S4 of the embodiment. In some cases, a standby time exists from when the specific angle is determined at step S3 until the process of step S4 is executed. If the speed of the vehicle 10 changes during the standby time, the specific angle determined in step S3 may be different from the specific angle acquired by the reception control section 51. By checking the speed of the vehicle 10 again immediately before the process of step S4, it is possible to check whether the specific angle determined in the process of step S3 matches with the specific angle corresponding to the speed of the vehicle 10 at the time of transmission of the transmission data. When the specific angle determined in the process of step S3 does not match with the specific angle at the time of transmission of the transmission data, the transmission control section 35 may stop transmitting the transmission data.

As described above, in some cases, a standby time exists from when the specific angle is determined at step S3 until the process of step S4 is executed. Thus, the reception control section 51 may take the standby time into consideration and obtain, upon reception of the transmission data, the speed of the vehicle 10 acquired at a predetermined length of time before the present.

The reception control section 51 may calculate the speed of the vehicle 10 from changes in the position of the vehicle 10 obtained from the GPS information. Alternatively, the reception control section 51 may calculate the speed of the vehicle 10 by using the steering angle, the detection value of the acceleration sensor mounted on the vehicle, the detection value of the gyro sensor, and the like.

The transmission control section 35 may calculate the speed of the vehicle 10 from the acceleration of the acceleration sensor 34. In this case, the possible values of the acceleration detected by the acceleration sensor 34 are divided into a plurality of ranges, and specific angles are assigned to the respective ranges. For example, the range of values lower than the acceleration corresponding to 40 km/h is defined a first range, and the range of values higher than or equal to the acceleration corresponding to 40 km/h is defined as a second range. Since the acceleration and the speed of the vehicle 10 have a correlation with each other, the correspondence relationship in which the specific angles are assigned to the ranges obtained by dividing the possible values of the acceleration is regarded as the same correspondence relationship in which the specific angles are assigned to the ranges obtained by dividing the possible values of the speed of the vehicle 10. Thus, as in the embodiment, the reception storage section 55 is simply required to store the correspondence relationship between the ranges of the speed of the vehicle 10 and the specific angles.

The transmission data is simply required to include either the pressure data or the temperature data. That is, only a single piece of tire condition data needs to be included in the transmission data. In this case, the transmitter 31 is simply required to include either the pressure sensor 32 or the temperature sensor 33 as the condition detecting section.

Various types of power generating elements may be used as the power source of the transmitter 31. Even if a member that is capable of being charged or generating power is used as the power source, there is a limit to power that can be used. Therefore, it is preferable to reduce the power consumption by transmission of the transmission data. Thus, by transmitting the transmission data without data indicating the angle information, the limited power is used effectively.

In each embodiment, the vehicle 10 is simply required to include multiple wheel assemblies 11, and for example, the vehicle 10 may be a motorcycle.

DESCRIPTION OF THE REFERENCE NUMERALS

10 . . . Vehicle; 11 . . . Wheel Assembly; 13 . . . Tire; 21, 22, 23, 24 . . . Rotation Sensor Unit; 30 . . . Tire Condition Monitoring System; 31 . . . Transmitter; 32 . . . Pressure Sensor (Condition Detecting Section); 33 . . . Temperature Sensor (Condition Detecting Section); 34 . . . Acceleration Sensor (Traveling State Detecting Section); 35 . . . Transmission Control Section (Data Generating Section); 35b . . . Storage Section; 36 . . . Transmission Circuit (Transmitting Section); 37 . . . Battery (Power Source); 50 . . . Receiver; 51 . . . Reception Control Section (Identifying Section and Obtaining Section); 52 . . . Reception Circuit (Receiving Section); 55 . . . Reception Storage Section.

The invention claimed is:

1. A tire condition monitoring system comprising:
transmitters respectively attached to a plurality of wheel assemblies of a vehicle; and
a receiver mounted on the vehicle, wherein
the vehicle includes rotation angle detecting sections that detect rotation angles of the respective wheel assemblies,
each of the transmitters includes
a power source of the transmitter,
a condition detecting section that is configured to detect a condition of a tire,
a traveling state detecting section that is configured such that a detection value varies in accordance with a traveling state of the vehicle, wherein the traveling state detection section is an acceleration sensor configured to detect an acceleration generated by rotation of a corresponding one of the plurality of wheel assemblies, wherein a detection value of the acceleration sensor varies in accordance with a vehicle speed, and a specific angle can be determined based on the detection value of the acceleration sensor,
a data generating section that is configured to generate transmission data that includes tire condition data indicating the condition of the tire detected by the condition detecting section and does not include data indicating the detection value of the traveling state detecting section,
a transmitting section that is configured to modulate the transmission data, which is generated by the data generating section, and transmit the modulated data,
a storage section that stores a correspondence relationship in which ranges obtained by dividing possible values of the detection value of the traveling state detecting section are respectively assigned to a plurality of specific angles set for rotation angles of the wheel assemblies, and
a transmission control section capable of performing specific angle transmission in which the transmission control section transmits the transmission data from the transmitting section when detecting that the rotation angle of the wheel assembly is any of the specific angles,
the transmission control section is configured to, when performing the specific angle transmission, transmit the transmission data when detecting that the rotation angle of the wheel assembly is the specific angle that corresponds to the detection value of the traveling state detecting section,
the receiver includes
a reception control section,
a receiving section that is configured to be capable of receiving the transmission data from the transmitters and output the transmission data from the transmitter to the reception control section,
an identifying section that, upon reception of the transmission data transmitted at the specific angle, identifies one of the wheel assemblies to which the transmitter is attached based on an angle detection value obtained from the rotation angle detecting section,
a reception storage section that stores the correspondence relationship, and
an obtaining section that obtains the detection value from a vehicle-side traveling state detecting section that is different from a member constituting the transmitter, and
the identifying section is configured to
acquire the specific angle at which the transmission data has been transmitted from the correspondence relationship and the detection value that is obtained by the obtaining section upon reception of the transmission data by the receiving section, and
identify one of the wheel assemblies to which the transmitter is attached based on the specific angle,
wherein the speed of the vehicle can be detected by both the transmission control section and the reception control section.

2. A transmitter that is attached to each of a plurality of wheel assemblies, wherein
a vehicle includes rotation angle detecting sections that detect rotation angles of the respective wheel assemblies,
the transmitter includes
a power source of the transmitter,
a condition detecting section that is configured to detect a condition of a tire,
a traveling state detecting section that is configured such that a detection value varies in accordance with a traveling state of the vehicle, wherein the traveling state detecting section is an acceleration sensor, and wherein a detection value of the acceleration sensor varies in accordance with a vehicle speed, and a specific angle can be determined based on the detection value of the acceleration sensor,
a data generating section that is configured to generate transmission data that includes tire condition data indicating the condition of the tire detected by the condition detecting section and does not include data indicating the detection value of the traveling state detecting section,
a transmitting section that is configured to modulate the transmission data, which is generated by the data generating section, and transmit the modulated data,
a storage section that stores a correspondence relationship in which ranges obtained by dividing possible values of the detection value of the traveling state detecting section are respectively assigned to a plurality of specific angles set for rotation angles of the wheel assemblies, and
a transmission control section capable of performing specific angle transmission in which the transmission control section transmits, to a receiver, the transmission data from the transmitting section when detecting that the rotation angle of the wheel assembly is any of the specific angles, the receiver including a reception control section, a reception storage section that stores the correspondence relationship, an obtaining section that obtains the detection value from a vehicle-side traveling state detecting section that is different from a member constituting the transmitter, and an identifying section that, upon reception of the transmission data, identifies a position of the wheel assembly to which the transmitter is attached based on an angle detection value obtained from the rotation angle detecting section, and the transmission control section is configured to, when performing the specific angle transmission, transmit the transmission data when detecting that the rotation angle of the wheel assembly is the specific angle that corresponds to the detection value of the traveling state detecting section, wherein the speed of the vehicle can be detected by both the transmission control section and the reception control section.

3. A receiver mounted on a vehicle that includes rotation angle detecting sections that detect rotation angles of respective wheel assemblies, the receiver comprising:

a reception control section that is configured to be capable of receiving transmission data from a transmitter capable of transmitting the transmission data when detecting that a rotation angle of the wheel assembly is a specific angle, wherein the transmitter includes a transmission control section, wherein the specific angle is based on an assigned range of detection values provided by a traveling state detecting section within the transmitter, and wherein the traveling state detecting section is an acceleration sensor, and wherein a detection value of the acceleration sensor varies in accordance with a vehicle speed, and a specific angle can be determined based on the detection value of the acceleration sensor;

an identifying section that, upon reception of the transmission data transmitted at the specific angle, identifies one of the wheel assemblies to which the transmitter is attached based on an angle detection value obtained from the rotation angle detecting section, a reception storage section that stores a correspondence relationship in which ranges obtained by dividing possible values of a detection value that changes in accordance with a rotation speed of the wheel assembly are respectively assigned to a plurality of specific angles set for rotation angles of the wheel assemblies, and an obtaining section that obtains the detection value from a vehicle-side traveling state detecting section that is different from a member constituting the transmitter, wherein the reception control section is configured to receive the transmission data from the transmitter that transmits the transmission data at the specific angle corresponding to the correspondence relationship, and the identifying section is configured to acquire the specific angle at which the transmission data has been transmitted from the correspondence relationship and the detection value that is obtained by the obtaining section upon reception of the transmission data by the receiving section in the presence or absence of data indicating angle information, and identify one of the wheel assemblies to which the transmitter is attached based on the specific angle, wherein the speed of the vehicle can be detected by both the transmission control section and the reception control section.

* * * * *